United States Patent
Jeon et al.

(10) Patent No.: US 11,146,161 B2
(45) Date of Patent: Oct. 12, 2021

(54) ELECTRONIC SYSTEM INCLUDING VOLTAGE REGULATORS

(71) Applicant: Samsung Electronics Co., Ltd., Suwon-si (KR)

(72) Inventors: Byungchul Jeon, Seongnam-si (KR); Hyunseok Kim, Gwacheon-si (KR); Junho Huh, Yongin-si (KR); Jaemin Kim, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 15/931,798

(22) Filed: May 14, 2020

(65) Prior Publication Data

US 2021/0036596 A1 Feb. 4, 2021

(30) Foreign Application Priority Data

Aug. 1, 2019 (KR) .................. 10-2019-0094023

(51) Int. Cl.
*H02M 1/00* (2006.01)
*H02M 3/158* (2006.01)

(52) U.S. Cl.
CPC ............. *H02M 1/00* (2013.01); *H02M 1/008* (2021.05); *H02M 1/009* (2021.05); *H02M 3/1584* (2013.01)

(58) Field of Classification Search
CPC .......... H02M 3/158; H02M 2001/009; H02M 3/1584; H02M 2001/008; G06F 1/263; H02J 1/102
See application file for complete search history.

(56) References Cited

U.S. PATENT DOCUMENTS

| | | |
|---|---|---|
| 4,419,723 A | 12/1983 | Wilson, Jr. |
| 5,519,307 A | 5/1996 | Moon |
| 5,541,828 A | 7/1996 | Rozman |
| 5,617,015 A | 4/1997 | Goder et al. |
| 5,751,139 A | 5/1998 | Jordan et al. |
| 6,072,709 A | 6/2000 | Raets |
| 6,222,352 B1 | 4/2001 | Lenk |
| 6,548,985 B1 | 4/2003 | Hayes et al. |
| 7,256,568 B2 | 8/2007 | Lam et al. |
| 7,312,538 B2 | 12/2007 | May |
| 7,336,507 B2 | 2/2008 | Inukai |
| 7,365,522 B2 | 4/2008 | Chen et al. |
| 7,432,614 B2 | 10/2008 | Ma et al. |
| 8,106,531 B2 | 1/2012 | Tseng et al. |
| 8,427,121 B2 | 4/2013 | Notman |
| 8,531,165 B2 | 9/2013 | Chen et al. |
| 8,624,429 B2 | 1/2014 | Jing et al. |
| 8,773,088 B2 | 7/2014 | Menegoli et al. |
| 9,007,039 B2 | 4/2015 | Kim et al. |

(Continued)

*Primary Examiner* — Ryan Johnson
(74) *Attorney, Agent, or Firm* — Harness, Dickey & Pierce, P.L.C.

(57) ABSTRACT

An electronic system includes a plurality of voltage regulators configured to convert an input voltage, a plurality of inductors respectively connected to the plurality of voltage regulators to respectively output a plurality of converting currents, and a switching unit configured to select at least one converting current from among the plurality of converting currents in response to a switching control signal and supply power to a load unit based on the selected at least one converting current.

19 Claims, 11 Drawing Sheets

(56) References Cited

U.S. PATENT DOCUMENTS

| | | |
|---|---|---|
| 9,099,919 B2 | 8/2015 | Jing et al. |
| 9,118,246 B2 | 8/2015 | Buthker |
| 9,154,357 B2 | 10/2015 | Tasic et al. |
| 9,287,781 B2 | 3/2016 | Wilson |
| 9,343,967 B2 | 5/2016 | Shao |
| 9,379,611 B2 | 6/2016 | Zhao |
| 9,529,375 B2 | 12/2016 | Bayer |
| 9,590,506 B2 | 3/2017 | Rince et al. |
| 9,692,296 B1 | 6/2017 | Dash et al. |
| 9,698,685 B2 | 7/2017 | Calhoun et al. |
| 9,746,868 B2 | 8/2017 | Shrivastava et al. |
| 9,831,672 B2 | 11/2017 | Luh et al. |
| 9,871,004 B2 | 1/2018 | Zhai |
| 9,990,022 B2 * | 6/2018 | Wong ................. H02J 1/108 |
| 10,063,147 B2 | 8/2018 | Hoyerby |
| 10,084,376 B2 | 9/2018 | Lofthouse |
| 10,181,722 B2 | 1/2019 | Wu et al. |
| 10,218,282 B1 | 2/2019 | Moore et al. |
| 10,381,925 B2 * | 8/2019 | Lee ..................... H02M 3/02 |
| 2006/0214646 A1 | 9/2006 | Huang |
| 2007/0024256 A1 | 2/2007 | Chou |
| 2007/0041133 A1 | 2/2007 | Miermans |
| 2007/0262760 A1 | 11/2007 | Liu |
| 2008/0231115 A1 | 9/2008 | Cho et al. |
| 2009/0040794 A1 | 2/2009 | Williams |
| 2009/0079404 A1 | 3/2009 | Pigott |
| 2012/0086426 A1 | 4/2012 | Smith |
| 2013/0141070 A1 | 6/2013 | Goessling et al. |
| 2014/0152104 A1 | 6/2014 | Kung |
| 2015/0311791 A1 | 10/2015 | Tseng et al. |
| 2016/0049860 A1 * | 2/2016 | Ihs ..................... H02M 3/158 323/282 |
| 2017/0141603 A1 | 5/2017 | King et al. |
| 2017/0187187 A1 | 6/2017 | Amin et al. |
| 2017/0194857 A1 | 7/2017 | Hang et al. |
| 2017/0255214 A1 | 9/2017 | Ho et al. |
| 2017/0277238 A1 * | 9/2017 | Park ..................... G06F 1/266 |
| 2017/0287615 A1 | 10/2017 | Lu et al. |
| 2018/0198361 A1 | 7/2018 | Seong et al. |
| 2018/0294726 A1 | 10/2018 | Priego et al. |
| 2019/0028029 A1 | 1/2019 | Bieber et al. |
| 2019/0103766 A1 | 4/2019 | Von Novak, III et al. |

* cited by examiner

ELECTRONIC SYSTEM INCLUDING VOLTAGE REGULATORS

CROSS-REFERENCE TO RELATED APPLICATION

This application claims the benefit of Korean Patent Application No. 10-2019-0094023, filed on Aug. 1, 2019, in the Korean Intellectual Property Office, the disclosure of which is incorporated herein in its entirety by reference.

BACKGROUND

Example embodiments of the inventive concepts relate to an electronic system including a plurality of voltage regulators. For example, at least some example embodiments relate to an electronic system which provides multiple outputs of a plurality of voltage regulators through a plurality of inductors.

With the advancement of the electronics industry, the amount of information processed by a processing unit increases rapidly, and a degree of integration of the processing unit is enhanced. Due to this, the complexity of an electronic system for supporting multiple power outputs to internal elements (for example, a plurality of cores, an internal memory, etc.) of the processing unit is increasing. The electronic system may include a voltage regulator to convert a voltage input from a power source and output a converted voltage to the processing unit. However, due to a limited amount of current of each of a voltage regulator and an inductor connected to the voltage regulator, it may be difficult to satisfy the floating power requirement for the processing unit.

SUMMARY

Example embodiments of the inventive concepts provide an electronic system which reduces (or, alternatively, minimizes) a total amount of current needed for a power source including a plurality of voltage regulators and supports multiple power outputs.

According to an example embodiment of the inventive concepts, there is provided an electronic system including a plurality of voltage regulators configured to convert an input voltage; a plurality of inductors connected to respective ones of the plurality of voltage regulators, the plurality of inductors configured to output a plurality of converting currents, respectively; and a switching device configured to select at least one selected converting current from among the plurality of converting currents in response to a switching control signal, and to supply power to a load based on the at least one selected converting current.

According to another example embodiment of the inventive concepts, there is provided an electronic system including a plurality of voltage regulators configured to convert an input voltage; a plurality of inductors respectively connected to respective ones of the plurality of voltage regulators, the plurality of inductors configured to output a plurality of converting currents, respectively; a switching device configured to select at least one selected converting current from among the plurality of converting currents in response to a switching control signal; a capacitor connected to an output of the switching device, the capacitor configured to generate an output voltage based on the at least one selected converting current; and a load configured to operate based on the output voltage.

According to another example embodiment of the inventive concepts, there is provided an electronic system including a plurality of voltage regulators configured to convert an input voltage based on a regulator control signal; a plurality of inductors connected to respective ones of the plurality of voltage regulators, the plurality of inductors configured to output a plurality of converting currents, respectively; a switching deice configured to select at least one selected converting current from among the plurality of converting currents in response to a switching control signal; and a controller configured to, receive an output voltage based on the at least one selected converting current as feedback, compare the output voltage with a reference voltage, and output the switching control signal and the regulator control signal.

BRIEF DESCRIPTION OF THE DRAWINGS

Example embodiments of the inventive concepts will be more clearly understood from the following detailed description taken in conjunction with the accompanying drawings in which.

DETAILED DESCRIPTION

Hereinafter, example embodiments will be described in detail with reference to the accompanying drawings.

Figure 1:
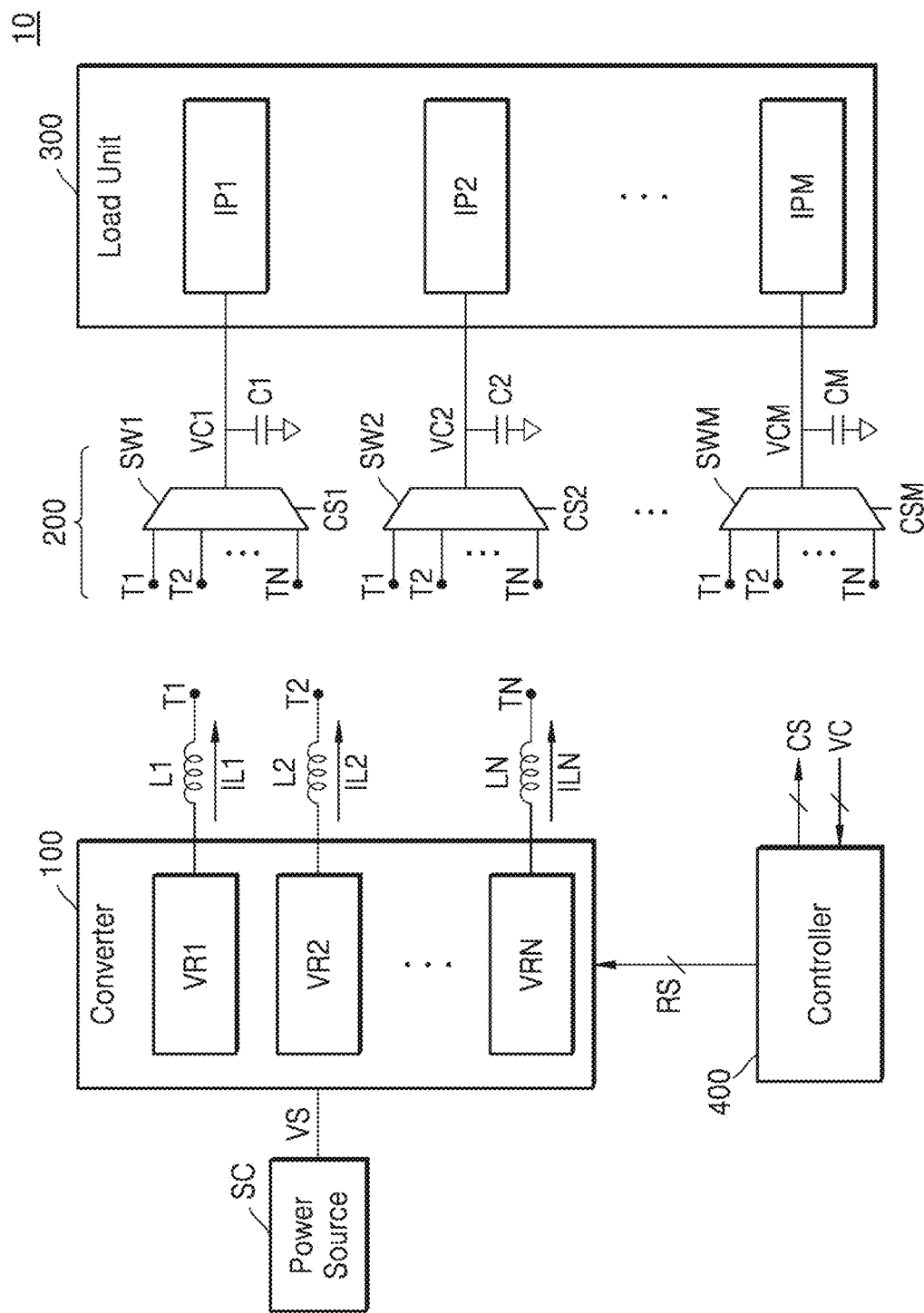
FIG. 1 is a block diagram for describing an electronic system according to an example embodiment.

FIG. 1 is a block diagram of an electronic system 10 according to an example embodiment.

Referring to FIG. 1, the electronic system 10 may include a converter 100, a plurality of inductors (for example, first to $N^{th}$ inductors) L1 to LN, a switch circuit 200, a plurality of capacitors C1 to CM, a load unit 300, and a controller 400. The converter 100 may include a plurality of voltage regulators (for example, first to $N^{th}$ voltage regulators) VR1 to VRN, the switch circuit 200 may include a plurality of switching units (for example, first to $M^{th}$ switching units) SW1 to SWM, and the load unit 300 may include a plurality of loads IP1 to IPM.

The converter 100 may receive an input voltage VS from a power source SC and may output a plurality of converting currents (for example, first to $N^{th}$ converting currents) IL1 to ILN. For example, the converter 100 may generate a plurality of converting voltages. Each of the converting voltages may be a voltage which is obtained when a level of an input voltage VS is stepped down. Each of the first to $N^{th}$ inductors L1 to LN may output a converting current on the basis of a converting voltage. For example, the first voltage regulator VR1 may generate a first converting voltage, and the first inductor L1 may generate the first converting current IL1 where an amount of current increases and decreases repeatedly, based on the first converting voltage. For example, when the first voltage regulator VR1 is turned on, the first inductor L1 may charge a current and the amount of the first converting current IL1 may increase. As another example, when the first voltage regulator VR1 is turned off, the first inductor L1 may discharge a current and the amount of the first converting current IL1 may decrease. Furthermore, operations of the plurality of voltage regulators VR2 to VRN may be similar to the above-described operation of the first voltage regulator VR1, and operations of the plurality of inductors L2 to LN may be similar to the above-described operation of the first inductor L1.

Each of the plurality of voltage regulators VR1 to VRN may be implemented as various types, and for example, may be implemented as at least one type among a buck converter, a boost converter, a buck-boost converter, a chuck converter, a forward converter, and a flyback converter. Also, each of the plurality of voltage regulators VR1 to VRN may be implemented as one chip, package, or circuit. Also, the plurality of voltage regulators VR1 to VRN may be included in a power management integrated circuit (PMIC) or an integrated voltage regulator (IVR).

The plurality of voltage regulators VR1 to VRN included in the converter 100 may have a certain voltage capacity or current capacity. Also, the plurality of inductors L1 to LN respectively connected to the plurality of voltage regulators VR1 to VRN may each have a certain voltage capacity or current capacity. For example, in the plurality of voltage regulators VR1 to VRN and the plurality of inductors L1 to LN, an amount of current capable of being maximally output may be limited. Due to a limited amount of current, the load unit 300 may not be supplied with sufficient power. According to example embodiments, the electronic system 10 may use two or more voltage regulators and two or more inductors, and thus, may output a current which is equal to or higher than a current capacity capable of being supplied based on one voltage regulator and one inductor.

The electronic system 10 according to an example embodiment may include the plurality of voltage regulators VR1 to VRN for converting t input voltage VS, the plurality of inductors L1 to LN which are respectively connected to the plurality of voltage regulators VR1 to VRN and respectively output the plurality of converting currents IL1 to ILN, and the switch circuit 200 which selects at least one converting current from among the plurality of converting currents IL1 to ILN in response to a switching control signal (for example, CS1) and supplies power to a load (for example, IP1) on the basis of the selected at least one current.

One end of the switch circuit 200 according to an example embodiment may be connected to the plurality of inductors L1 to LN. For example, the switch circuit 200 and the plurality of inductors L1 to LN may share a plurality of connection nodes (for example, first to $N^{th}$ connection nodes) T1 to TN. Also, the other end of the switch circuit 200 may be connected to the capacitors (for example, first to $M^{th}$ capacitors) C1 to CM and the loads (for example, first to $M^{th}$ loads) IP1 to IPM. For example, the first switching unit SW1 may be connected to the first capacitor C1 and the first load IP1. The first capacitor C1 may receive an output current from the first switching unit SW1 and may apply a first output voltage VC1, charged into the first capacitor C1 with the output current, to the first load IP1. The output current may be one of the plurality of converting currents IL1 to ILN, or may be a sum of two or more of the plurality of converting currents IL1 to ILN.

Each of the switching units SW1 to SWM may select a converting current output from at least one of the plurality of inductors L1 to LN. For example, one end of the first switching unit SW1 may be connected to the plurality of inductors L1 to LN. Each of the switching units SW1 to SWM may output the selected converting current to a corresponding capacitor. For example, the other end of the first switching unit SW1 may be connected to the first capacitor C1. In this case, the first switching unit SW1 may select a second converting current IL2 from among the plurality of converting currents IL1 to ILN and may output the second converting current IL2 to the first capacitor C1. The first capacitor C1 may output the first output voltage VC1 to the first load IP1 in response to receiving the second converting current IL2. The first switching unit SW1 has been described above for convenience of description, but the other switching units SW2 to SWM may operate substantially as described above.

The load unit 300 according to an example embodiment may include various kinds of electronic components requiring power. For example, the first load IP1 may be implemented as one chip, one package, or one module. The other loads IP2 to IPM may be same. As another example, the load unit 300 may be a central processing unit (CPU), an application processor (AP), or a modem application processor (MoDAP). However, example embodiments are not limited thereto, and the load unit 300 may include various elements, requiring the supply of power, such as a graphics processing unit (GPU) and a memory device. As another example, the plurality of loads IP1 to IPM may include at least one of a core unit, an internal memory, and a memory interface. The core unit may include a single core and a multicore, and the multicore may include two or more cores. For example, the first load IP1 may be an internal memory (for example, static random access memory (SRAM)) of a CPU, each of the second to fourth loads IP2 to IP4 may be a core unit, the fifth load IP5 may be a memory interface, and the sixth load IP6 may be an element requiring power. The amounts of pieces of power needed for the second to fourth loads IP2 to IP4 may differ. The electronic system 10 described above will be described below in detail with reference to FIG. 2.

The controller 400 according to an example embodiment may receive, as feedback, an output voltage VC output from the switch circuit 200 or a capacitor (for example, C1). The controller 400 may output a control signal for controlling the plurality of voltage regulators VR1 to VRN and the switch circuit 200, based on the output voltage VC. The control signal may include the switching control signal CS and a regulator control signal RS. The switching control signal CS may include a plurality of switching control signals CS1 to CSM for controlling the plurality of switching units SW1 to SWM included in the switch circuit 200. Also, the regulator control signal RS may include a plurality of control signals for controlling the plurality of voltage regulators VR1 to VRN. The output voltage VC may include a plurality of output voltages VC1 to VCM. The controller 400 will be described below in detail with reference to FIG. 5.

According to an example embodiment, the first inductor L1 may output the first converting current IL1, input from the first voltage regulator VR1, to the first connection node T1. Also, the second inductor L2 may output the second converting current IL2, input from the second voltage regulator VR2, to the second connection node T2. Also, the $N^{th}$ inductor LN may output the $N^{th}$ converting current ILN, input from the $N^{th}$ voltage regulator VRN, to the $N^{th}$ connection node TN. Here, N may be an integer of more than 1.

According to an example embodiment, the number of voltage regulators VR1 to VRN may be an N number, the number of inductors L1 to LN may be the same as the number of voltage regulators VR1 to VRN, and the number of connection nodes T1 to TRN may be the same as the number of voltage regulators VR1 to VRN. The number of loads IP1 to IPM may be an M number, and the number of switching units SW1 to SWM may be the same as the number of loads IP1 to IPM. Here, M may be an integer of more than 1.

According to an example embodiment, when the number of inductors L1 to LN is an N number and the number of loads IP1 to IPM is an M number, the electronic system 10 may perform M*N number of switching operations of supplying power to the load unit 300. For example, the first switching unit SW1 may select the second converting current IL2 and may provide the selected second converting current IL2 to a corresponding load, the second switching unit SW2 may select the $N^{th}$ converting current ILN and may provide the selected $N^{th}$ converting current ILN to a corresponding load, and the $M^{th}$ switching unit SWM may select the first converting current IL1 and may provide the selected first converting current IL1 to a corresponding load. That is, the electronic system 10 may dynamically supply power on the basis of various states of power supplied to the load unit 300.

Figure 2:
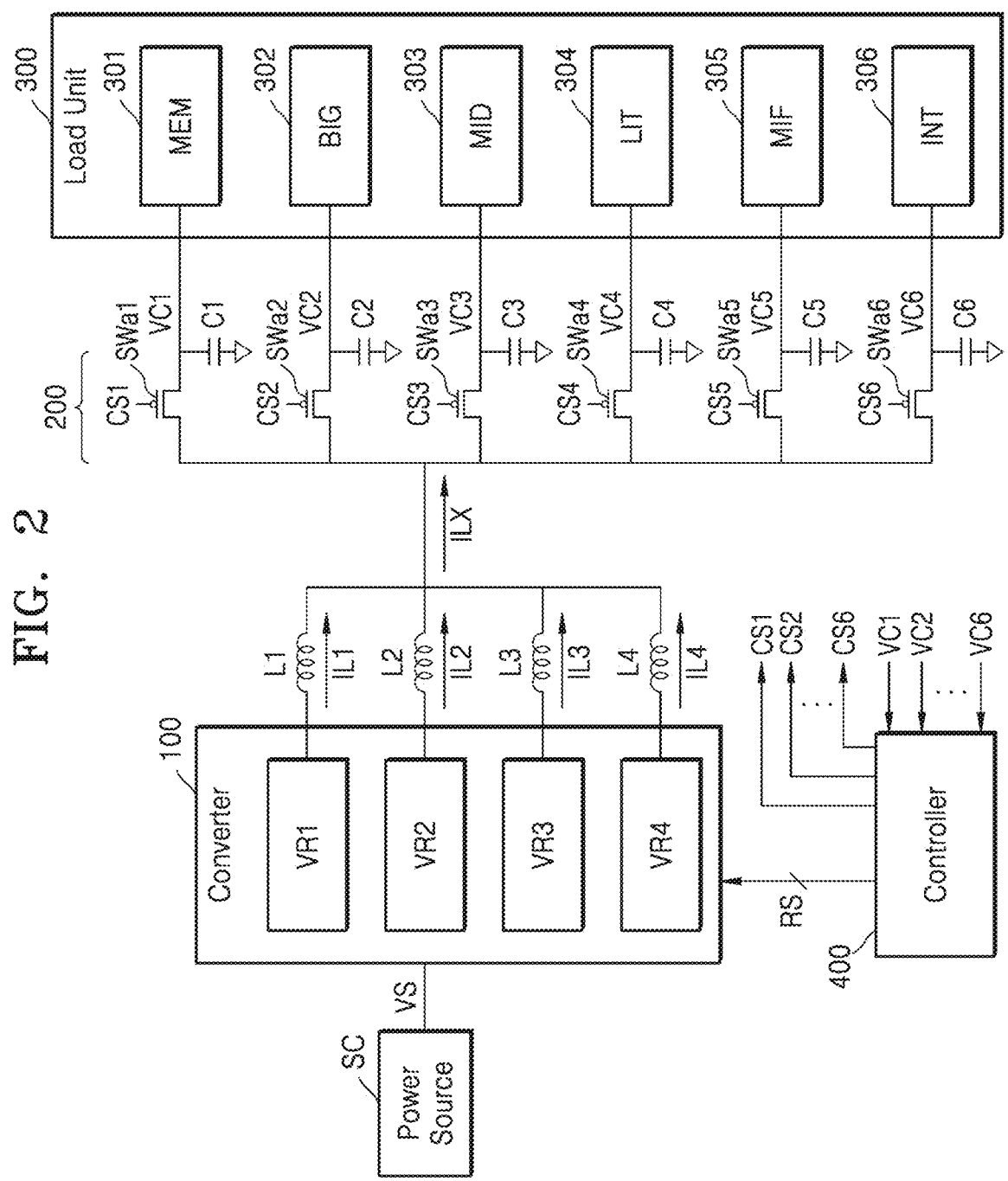
FIG. 2 is a block diagram for describing an electronic system according to an example embodiment.

FIG. 2 is a block diagram for describing the electronic system 10 according to an example embodiment. In FIGS. 1 and 2, like reference numerals refer to like elements.

Referring to FIG. 2, the electronic system 10 may include the converter 100, the plurality of inductors (for example, first to $N^{th}$ inductors) L1 to LN, the switch circuit 200, the plurality of capacitors C1 to CM, the load unit 300, and the controller 400. The converter 100 may include the plurality of voltage regulators (for example, first to $N^{th}$ voltage regulators) VR1 to VRN, the switch circuit 200 may include the plurality of switching units (for example, first to sixth switching units) SWa1 to SWa6, and the load unit 300 may include the plurality of loads (for example, first to sixth loads) 301 to 306.

According to an example embodiment, the plurality of voltage regulators VR1 to VR4 may be respectively and electrically connected to the inductors L1 to L4, and the number of voltage regulators VR1 to VR4 included in the electronic system 10 may be the same as the number of inductors L1 to L4 included in the electronic system 10. For example, the number of voltage regulators VR1 to VR4 may be four, and the number of inductors L1 to L4 may be four. Independently therefrom, the switching units SWa1 to SWa6 may be respectively and electrically connected to the loads 301 to 306, and the number of switching units SWa1 to SWa6 included in the electronic system 10 may be the same as the number of loads 301 to 306 included in the electronic system 10. The switching units SWa1 to SWa6 may be respectively connected to the loads 301 to 306, for providing an output voltage VC to a corresponding load.

According to an example embodiment, ends of the plurality of inductors L1 to L4 may be respectively connected to the plurality of voltage regulators VR1 to VR4, and the other ends of the plurality of inductors L1 to L4 may be short-circuited therebetween. For example, a plurality of converting currents (for example, first to fourth converting currents) IL1 to IL4 output from the plurality of inductors L1 to L4 may be summated, and the plurality of inductors L1 to L4 may output a converting current ILX, which is a summated current. In other words, the switch circuit 200 may receive the converting current ILX. The converting current ILX may be a current corresponding to a sum of the first converting current Ill, the second converting current IL2, the third converting current IL3, and the fourth converting current IL4, which are single-phase currents. That is, the converting current ILX may be a multi-phase current. This will be described below in detail with reference to FIG. 7.

According to an example embodiment, the switch circuit 200 may operate for providing power to the load unit 300. For example, the converting current ILX may be a current for providing power to one of the loads of the load unit 30. The converting current ILX may be output from the converter 100, for providing power to the first load 301. In this case, the first switching unit SWa1 may be turned on based on a switching control signal CS1, and the other switching units SWa2 to SWa6 may be turned off based on switching control signals CS2 to CS6. As another example, the converting current ILX may be a current for providing power to some of the loads of the load unit 300. In this case, at least two of the plurality of switching units SWa1 to SWa6 may be turned on, and the other switching units may be turned off. Each of the plurality of switching units SWa1 to SWa6 is illustrated as a PMOS transistor, but is not limited thereto and may be implemented as various selection devices.

According to an example embodiment, the load unit 300 may be a processing unit. The processing unit may be, for example, one of a CPU, an AP, and an MoDAP, but is not limited thereto. The first load 301 may be an internal memory, the second load 302 may be one (for example, a first core unit) of a plurality of cores, the third load 303 may be the other one (for example, a second core unit) of the plurality of cores, the fourth load 304 may be the other one (for example, a third core unit) of the plurality of cores, the fifth load 305 may be a memory interface, and the sixth load 306 may be internal elements of the processing unit requiring power. For example, the first core unit 302 may need higher power than the second core unit 303, and the second core unit 303 may need higher power than the third core unit 304. For example, the number of operations performed by the first core unit 302 may be less than the number of operations performed by the third core unit 304. As another example, the number of cores of the first core unit 302 may be more than the number of cores of the second core unit 303, and the number of cores of the second core unit 303 may be more than the number of cores of the third core unit 304.

According to an example embodiment, the controller 400 may control the plurality of voltage regulators VR1 to VR4 to supply power to at least one of the plurality of loads 301 to 306 in a certain time period. For example, the controller 400 may control the converter 100 on the basis of a regulator control signal RS. The controller 400 may receive output voltages VC1 to VC6, compare the received output voltages VC1 to VC6 with a reference voltage, and generate the regulator control signal RS on the basis of an error signal obtained through the comparison. This will be described below in detail with reference to FIG. 5.

Figure 3A:
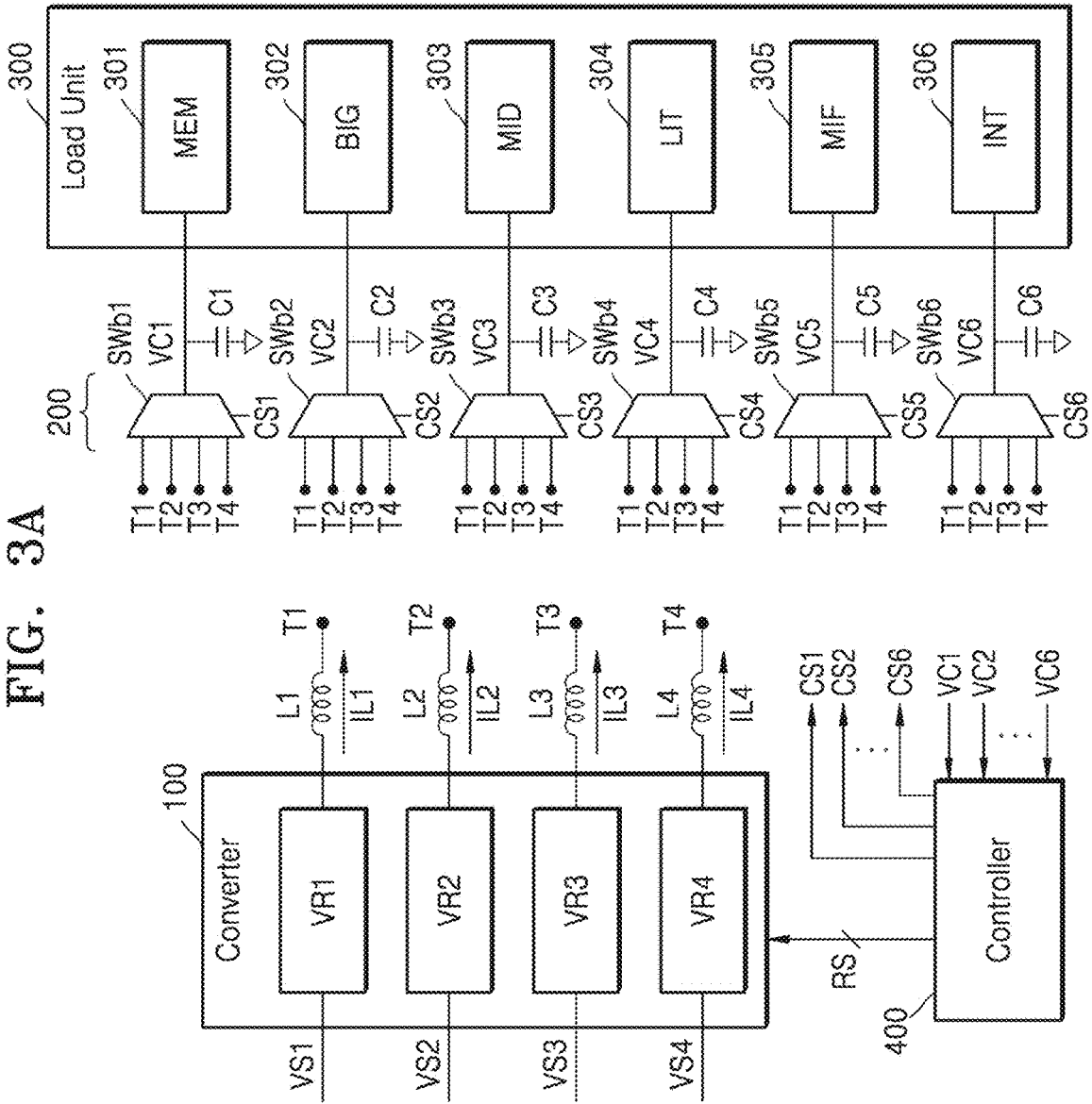
FIG. 3A is a block diagram for describing an electronic system according to an example embodiment.

FIG. 3A is a block diagram for describing an electronic system according to an example embodiment. In FIGS. 1 and 3A, like reference numerals refer to like elements.

Referring to FIG. 3A, a converter 100 may be supplied with a plurality of input voltages VS1 to VS4. That is, the converter 100 may be implemented as a single-input multiple-inductor multiple-output converter described above with reference to FIGS. 1 and 2, or may be implemented as a multiple-input multiple-inductor multiple-output converter as in FIG. 3A.

According to an example embodiment, a plurality of voltage regulators VR1 to VR4 may receive different input voltages. For example, ends of the plurality of voltage regulators VR1 to VR4 may respectively include input pads or input terminals for receiving different input voltages. In this case, as described above with reference to FIGS. 1 and 2, instead of receiving one input voltage VS through a line branching to each of the plurality of voltage regulators VR1 to VR4, the plurality of voltage regulators VR1 to VR4 may receive the input voltages VS1 to VS4 from different voltage sources. The other elements and operations are substantially the same as or similar to descriptions given above with reference to FIGS. 1 and 2, and thus, are omitted.

A switch circuit 200 may include a plurality of switching units SWb1 to SWb6, and each of the plurality of switching units SWb1 to SWb6 may receive at least one of converting currents IL1 to IL4 applied from a plurality of connection nodes T1 to T4. For example, the switch circuit 200 may select one converting current from among the converting currents IL1 to IL4 and may transfer the selected converting current to a capacitor, or may select two or more converting currents from among the converting currents IL1 to IL4, summate the selected converting currents, and transfer a summated current to the capacitor. This will be described below in detail with reference to FIG. 3B.

Figure 3B:
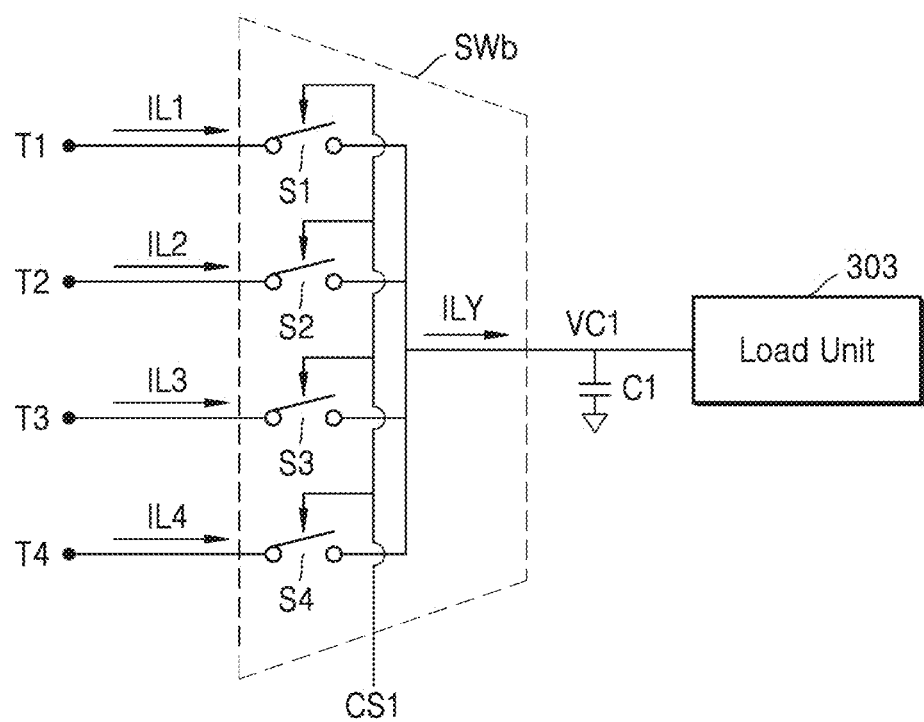
FIG. 3B is a circuit diagram for describing a switching unit according to an example embodiment.

FIG. 3B is a circuit diagram for describing a switching unit SWb according to an embodiment. In FIGS. 1 and 3B, like reference numerals refer to like elements.

Referring to FIG. 3B, the switching unit SWb may include a plurality of switches (for example, first to fourth switches) S1 to S4. Ends of the plurality of switches S1 to S4 may be respectively connected to a plurality of connection nodes T1 to T4 and may receive a plurality of converting currents (for example, first to fourth converting currents) IL1 to IL4 through the connection nodes T1 to T4. The other ends of the plurality of switches S1 to S4 may be short-circuited therebetween, and the switching unit SWb may output an output voltage VC1.

According to an example embodiment, the switching unit SWb may control a switching operation of each of the plurality of switches S1 to S4 on the basis of a switching control signal CS1. For example, the switching unit SWb may select one converting current from among the converting currents IL1 to IL4 and may output the selected converting current. When the first converting current IL1 is selected, only the first switch S1 may be turned on, and the other switches S2 to S4 may be turned off. As another example, the switching unit SWb may select a plurality of converting currents from among the converting currents IL1 to IL4. For example, when the first converting current IL1 and the second converting current IL2 are selected, the first switch S1 and the second switch S2 may be turned on, and the third switch S3 and the fourth switch S4 may be turned off. The switching unit SWb may summate the first converting current IL1 and the second converting current IL2 to output a converting current ILY. The switching unit SWb may output the converting current ILY to a capacitor C1, and the capacitor C1 may accumulate electrical charges based on the converting current ILY to generate an output voltage VC1. The output voltage VC1 may be a voltage for supplying power to a load unit 300.

Figure 4:
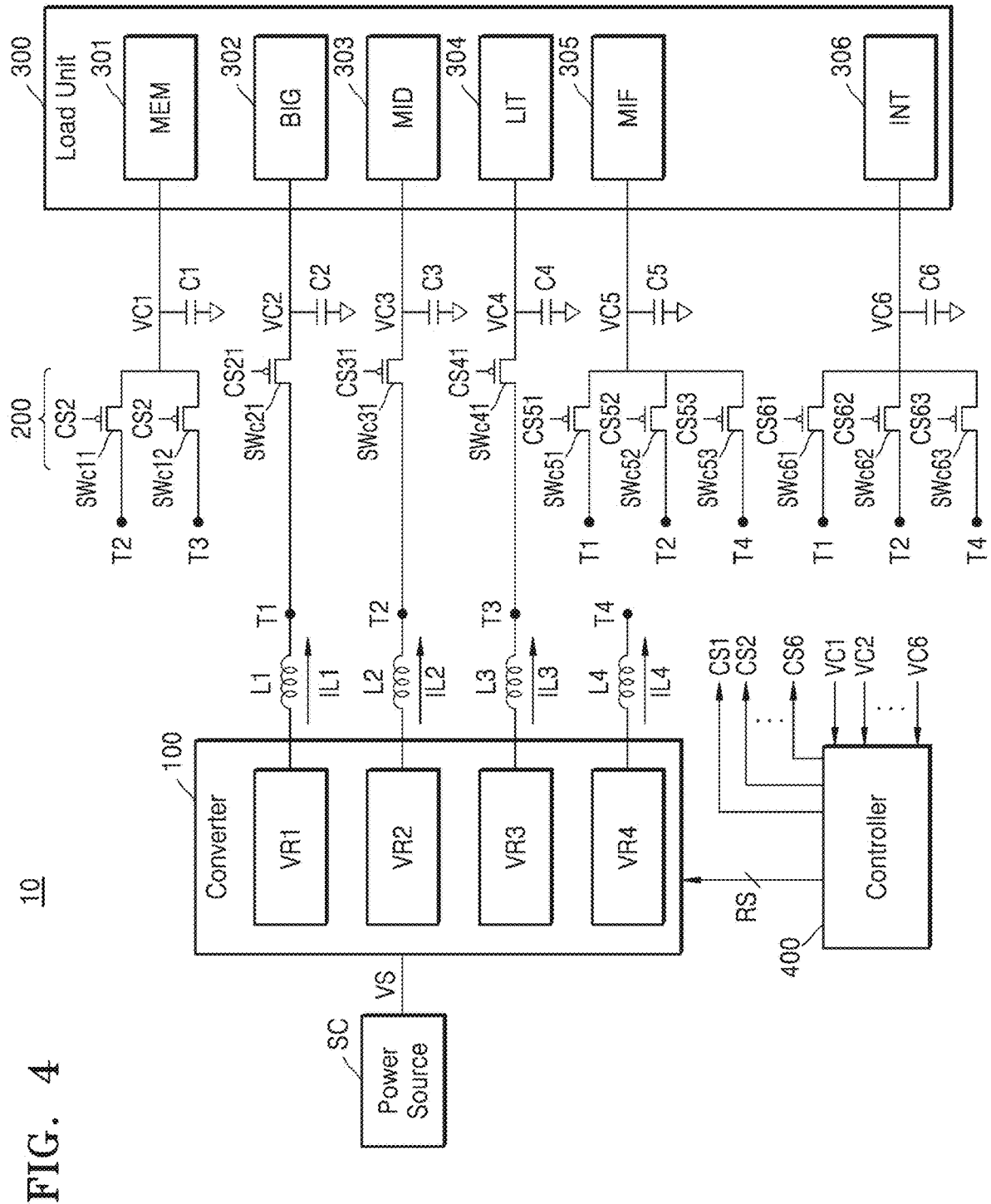
FIG. 4 is a block diagram for describing an electronic system including a modified-type switch circuit according to an example embodiment.

FIG. 4 is a block diagram for describing an electronic system 10 including a modified-type switch circuit according to an example embodiment.

Referring to FIG. 4, a switch circuit 200 may include a plurality of switches SWc11 to SWc63 and may be connected to a plurality of inductors L1 to L4 through a plurality of connection nodes T1 to T4.

According to an example embodiment, when a first core unit 301 operates, a current consumed by each of a second core unit 302 and a third core unit 303 may be low, and when the second core unit 302 and the third core unit 303 operate, a current consumed by the first core unit 301 may be low. In this case, the switch circuit 200 may include the plurality of switches SWc11 to SWc63. For example, a first load 301 may be selectively connected to two inductors L2 and L3 of the plurality of inductors L1 to L4 through the switching units SWc11 and SWc12. When the switching unit SWc11 is turned on, a first load 301 may receive a second converting current IL2 from the second connection node T2, and when the switching unit SWc12 is turned on, the first load 301 may receive a third converting current IL3 from the third connection node T3. As another example, a second load 302 may be selectively connected to one inductor L1 via the second connection node T2. As another example, a fifth load 305 may be selectively connected to three inductors L1, L2, and L4. When a certain switching unit included in the switch circuit 200 is turned on, a converting current flowing in an inductor connected to the certain switching unit may be provided to a load corresponding to the certain switching unit.

According to an example embodiment, the electronic system 10 may be implemented as various types. For example, a converter 100, the switch circuit 200, and a controller 400 may be implemented as one PMIC, and in this case, the load unit 300 may be implemented as a processing unit such as a CPU, an AP, and a MoDAP. The inductors L1 to L4 and a plurality of capacitors C1 to C6 may be included in a substrate on which the PMIC and the processing unit are mounted. As another example, the converter 100 may be implemented as a PMIC, and the switch circuit 200, the load unit 300, and the controller 400 may be implemented as one processing unit. Likewise, the inductors L1 to L4 and the capacitors C1 to C6 may be included in a substrate on which the PMIC and the processing unit are mounted. As another example, the electronic system 10 may be implemented as a processing unit, and in this case, the converter 100 may be implemented as an integrated voltage regulator (IVR).

Figure 5:
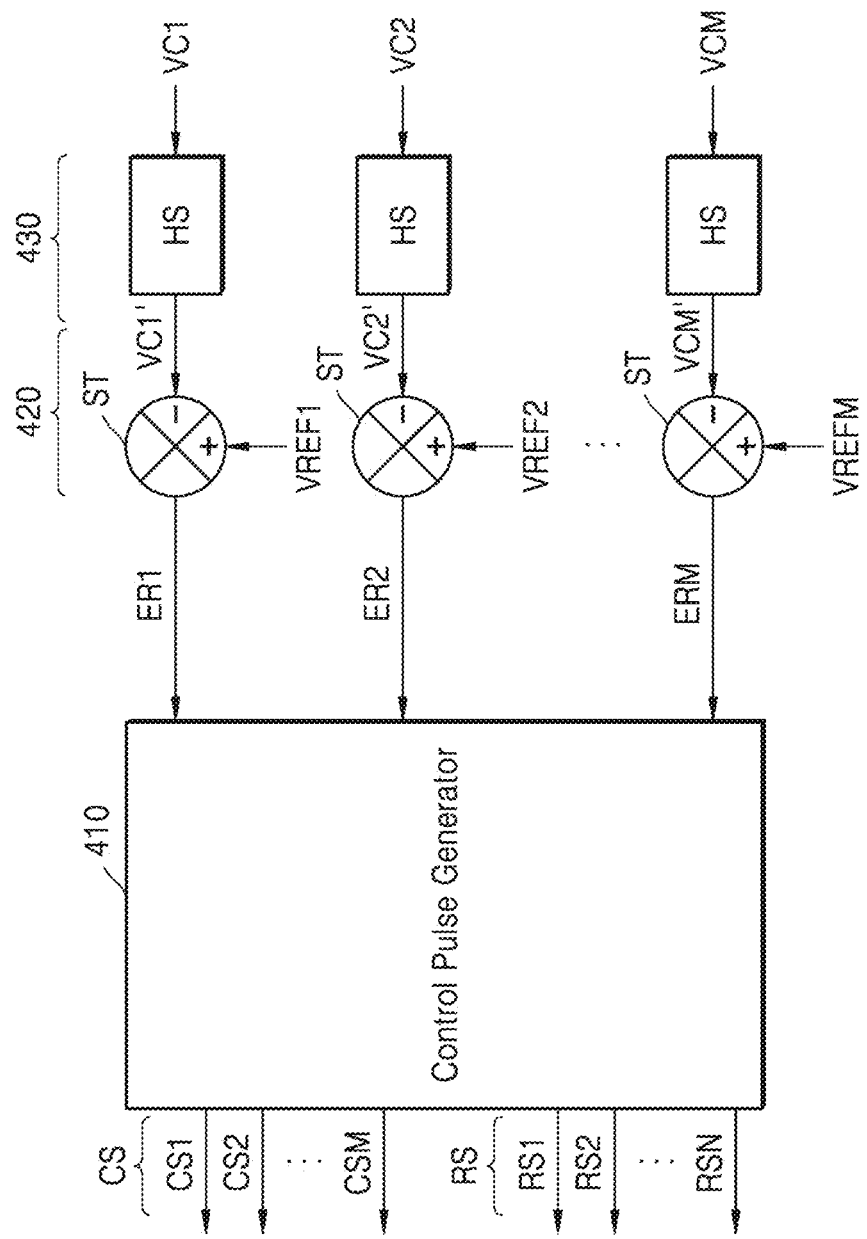
FIG. 5 is a block diagram for describing a controller according to an example embodiment.

FIG. 5 is a block diagram for describing a controller 400 according to an example embodiment. In FIGS. 1, 2 and 5, like reference numerals refer to like elements.

Referring to FIG. 5, the controller 400 may include a control pulse generator 410, a subtraction unit 420, a scale unit 430. The controller 400 may generate and output a switching control signal CS and a regulator control signal RS on the basis of output voltages (for example, first to $M^{th}$ output voltages) VC1 to VCM.

The control pulse generator 410 may output the regulator control signal RS and the switching control signal CS indicating logic high (for example, enable) or logic low (for example, disable) on the basis of error signals (for example, first to $M^{th}$ error signals) ER1 to ERM. For example, the control pulse generator 410 may compare the error signals ER1 to ERM to determine an error signal having a high level. For example, the first error signal ER1 may be determined to be higher in level than the second error signal ER2. Also, the control pulse generator 410 may determine polarities of the error signals ER1 to ERM, and for example, may determine the first error signal ER1 as a positive signal. The first error signal ER1 being a positive signal may denote that the first output voltage VC1 is lower than a first reference voltage VRE1. The control pulse generator 410 may output the regulator control signal RS and the switching control signal CS each being logic high or logic low on the basis of polarities of the error signals ER1 to ERM. For example, a first switching control signal CS1 that is logic high may turn on the first switching unit SWa1 of FIG. 2. As another example, the first switching control signal CS1 may be a multi-bit signal for controlling a plurality of switches. For example, at least one of the switches S1 to S4 included in the switching unit SWb of FIG. 3B may be turned on based on the first switching control signal CS1.

The subtraction unit 420 may include a plurality of subtractors ST and may output the error signals ER1 to ERM. Also, the scale unit 430 may include a plurality of scale circuits HS. For example, the plurality of scale circuits HS may respectively receive the first to $M^{th}$ output voltages VC1 to VCM to respectively output voltages VC1' to VCM' obtained by respectively adjusting levels of the first to $M^{th}$ output voltages VC1 to VCM. A subtractor ST receiving the voltage VC1' among the plurality of subtractors ST may receive a first reference voltage VREF1 along with the voltage VC1' and may subtract the voltage VC1' from the first reference voltage VREF1 to output the first error signal ER1.

Figure 6:
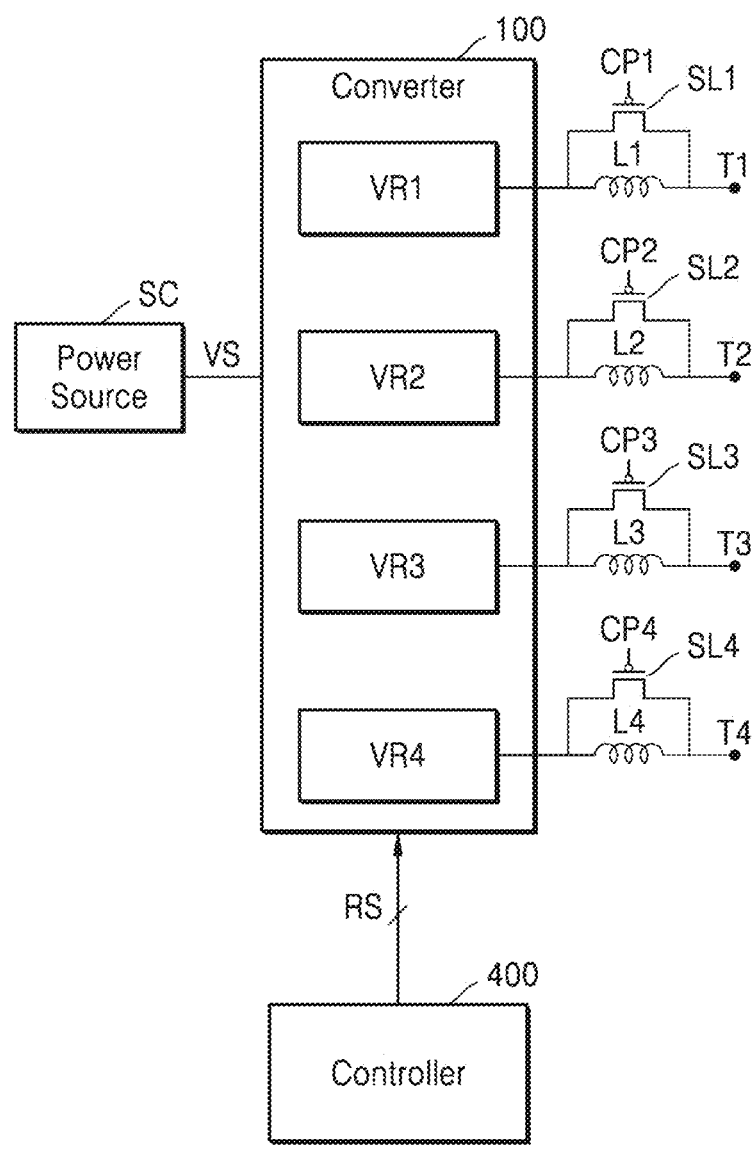
FIG. 6 is a block diagram for describing an electronic system including inductors including freewheeling switches according to an example embodiment.

FIG. 6 is a block diagram for describing an electronic system 10 including inductors including freewheeling switches according to an example embodiment.

Referring to FIG. 6, at least one of a plurality of inductors L1 to L4 may include a freewheeling switch SL1. For example, when a converter 100 is in a pseudo continuous conduction mode, the electronic system 10 may include the freewheeling switch SL1. In detail, both ends of a first inductor L1 may be connected to both ends of the freewheeling switch SL1 in parallel. In response to a logic high signal CP1, the freewheeling switch SL1 may be turned on, and a current flowing in the first inductor L1 may flow in a short-circuited freewheeling switch SL1 and a short-circuited inductor L1. That is, one mesh may be formed by the inductor L1 and the freewheeling switch SL1. Each of a plurality of freewheeling switches SL1 to SL4 is illustrated as a PMOS transistor, but is not limited thereto and may be implemented as an NMOS transistor or a transmission gate.

Figure 7:
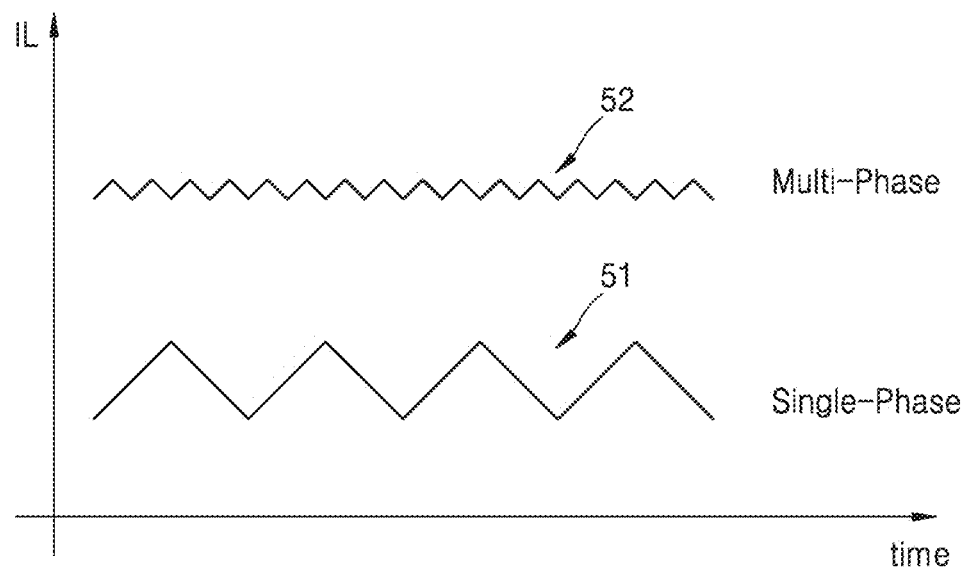
FIG. 7 is a waveform diagram for describing a single phase current and a multi-phase current according to an example embodiment.

FIG. 7 is a waveform diagram for describing a single phase current and a multi-phase current according to an example embodiment. In FIGS. 1, 2 and 7, like reference numerals refer to like elements.

Referring to FIG. 7, the abscissa axis may represent time and the ordinate axis may represent a level of a converting current IL. A first current 51 and a second current 52 may each be a converting current output from the converter 100 described above and an inductor (for example, L1). The first current 51 may be a single-phase current, and the second current 52 may be a multi-phase current. The multi-phase current may be a sum of a plurality of single-phase currents, and the multi-phase current may have a plurality of phases.

According to an embodiment, the second current 52 may be a converting current (ILX of FIG. 2). That is, the second current 52 may be a multi-phase current and may be a current corresponding to a sum of a plurality of single-phase currents (for example, IL1 to IL4 of FIG. 2). For example, since single-phase currents having different phase differences are summated, a frequency of the second current 52 may be higher than that of a single-phase current and the magnitude of ripple of the second current 52 may be reduced. Therefore, as in FIG. 2, the electronic system 10 may use a multi-phase current where ripple is small, and thus, may decrease switching loss caused by a high-frequency operation. Each of the converting currents IL1 to ILN flowing in the plurality of inductors L1 to LN has been described as a single-phase current, but is not limited thereto and may be a multi-phase current.

Figure 8:
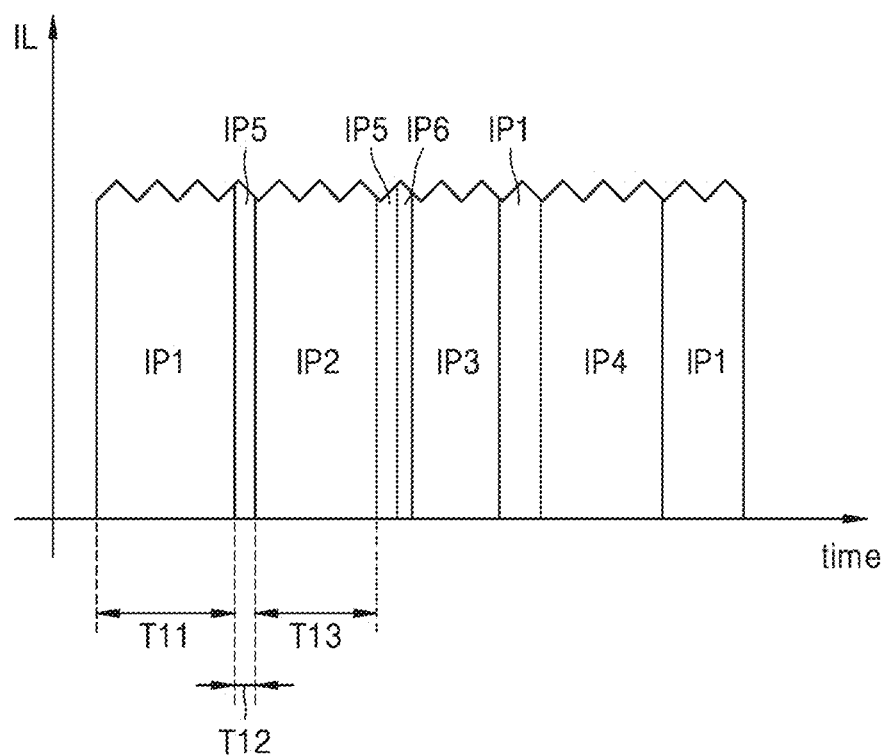
FIG. 8 is a waveform diagram of a converting current for describing a time division operation according to an example embodiment.

FIG. 8 is a waveform diagram of a converting current for describing a time division operation according to an example embodiment. In FIGS. 1 and 8, like reference numerals refer to like elements.

Referring to FIG. 8, a converting current IL may be supplied to different loads for each time period. For example, the converting current IL may be temporally divided to be provided to a first load IP1 in a first time period T11 and provided to a fifth load IP5 in a second time period T12. As shown, the converting current IL may be output from a voltage regulator having a continuous conduction mode. A time division operation may be implemented based on various schemes, and for example, may be a time division multiple access (TDMA) scheme.

According to an example embodiment, in a case which temporally divides the converting current IL, a level of the converting current IL at a divided time may not be limited. For example, when a time elapses from the first period T11 to the second time period T12, the switch circuit 200 may perform a switching operation to provide the converting current IL from the first load IP1 to the fifth load IP5. In this case, a switching operation may be performed regardless of a level of the converting current IL. However, when the switching circuit 200 performs a switching operation under a condition where the converting current IL has a certain level, switching loss may occur. That is, switching loss may occur due to a hard switching operation. The switching loss of the switch circuit 200 may be reduced by a method described below with reference to FIG. 9.

Figure 9:
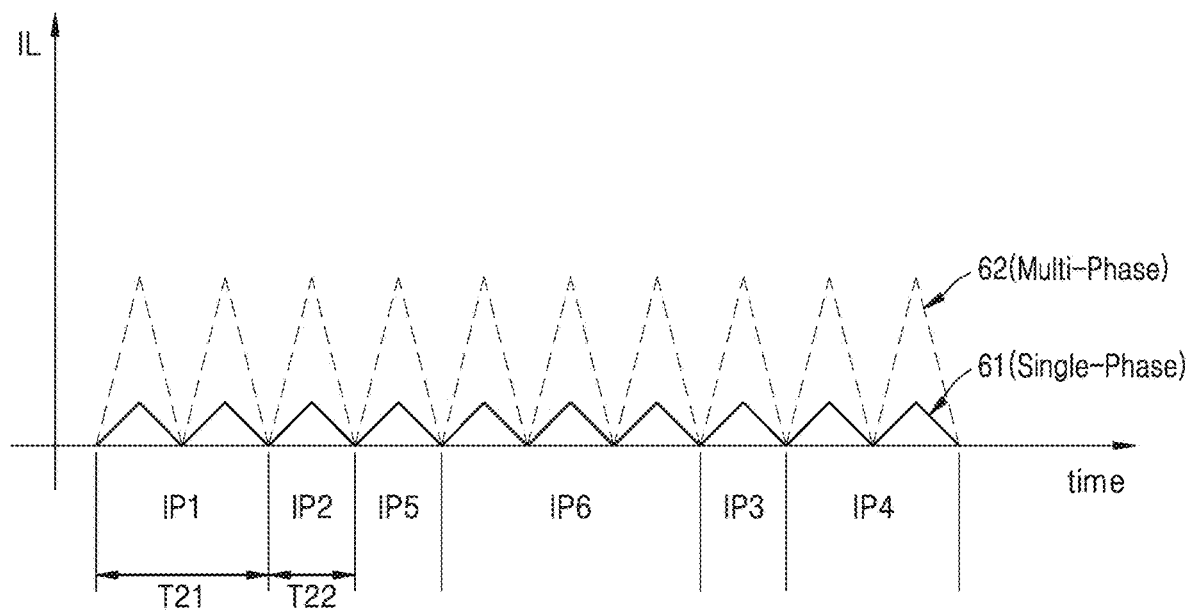
FIG. 9 is a waveform diagram of a converting current for describing a time division operation using a zero-current sensing operation according to an example embodiment.

FIG. 9 is a waveform diagram of a converting current for describing a time division operation using a zero-current sensing operation according to an example embodiment. In FIGS. 1 and 9, like reference numerals refer to like elements.

Referring to FIG. 9, a converting current IL may be supplied to different loads for each time period. For example, the converting current IL may be temporally divided to be provided to a first load IP1 in a first time period T21 and provided to a second load IP2 in a second time period T22. As shown, the converting current IL may be output from a voltage regulator having a discontinuous conduction mode. Also, the converting current IL may be a single-phase current 61, and as shown as a broken line, may be a multi-phase current 62. The multi-phase current 62 corresponding to a sum of a plurality of single-phase currents 61 may have ripple which is greater than that of the single-phase current 61.

According to an example embodiment, when a level of the converting current IL is 0, the switch circuit 200 may turn on a load which outputs the converting current IL. Alternatively, when a level of a first converting current IL1 is 0, the switch circuit 200 may select another converting current IL2. That is, the switching circuit 200 may perform a zero-current sensing operation. For example, when a level of the first converting current IL1 is 0, the first switching unit SW1 may perform a switching operation and may select a second converting current IL2 on the basis of the switching operation.

When a level of the converting current IL1 is 0, the switching circuit 200 may perform a switching operation. Therefore, switching loss may be reduced. That is, switching loss may be reduced by a soft switching operation. The switching circuit 200 may perform a switching operation at a high frequency. In a time division operation, the magnitude of ripple may be large, but when the switch circuit 200 frequently performs a switching operation at a high frequency, the magnitude of ripple may decrease and loss caused by a high-frequency switching operation may be reduced.

According to an example embodiment, the switch circuit 200 may perform a switching operation on the basis of a period of the converting current IL. That is, a K (where K is an integer of 1 or more) period of the converting current IL, the switch circuit 200 may provide the converting current IL to a certain load (for example, IP1). For example, after two periods of the converting current IL elapse, the switch circuit 200 may change a load, which provides the converting current IL, from a first load IP1 to a second load IP2. In other words, the switch circuit 200 may provide the converting current IL to the first load IP1 during two periods. As another example, the switch circuit 200 may provide the converting current IL to a sixth load IP6 during three periods.

Figure 10:
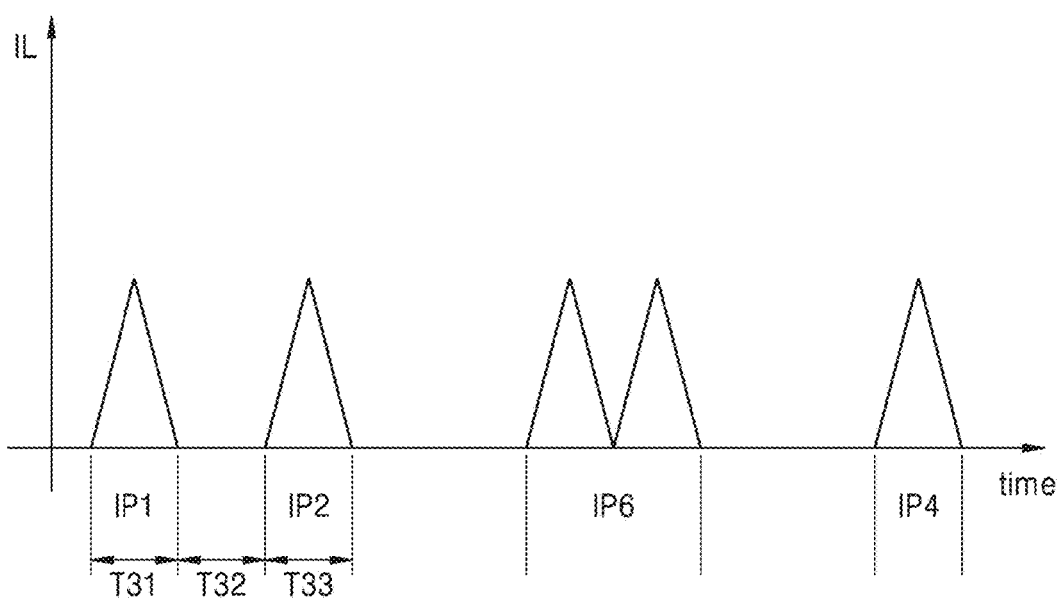
FIG. 10 is a waveform diagram of a converting current provided to a lightweight load unit according to an example embodiment.

FIG. 10 is a waveform diagram of a converting current provided to a lightweight load unit according to an example embodiment. In FIGS. 1 and 10, like reference numerals refer to like elements.

Referring to FIG. 10, when power needed for the load unit 300 is low, the switch circuit 200 may discontinuously provide a converting current IL to a plurality of loads IP1 to IPM. For example, when the load unit 300 is a processing unit which is performing a small number of operations, the load unit 300 may not continuously be supplied with the converting current IL. For example, the switch circuit 200 may provide the converting current IL to a first load IP1 in a first time period T31, and then, may have a certain idle period T32. The converter 100 may not output the converting current IL in the idle period T32, and the switch circuit 200 may turn off all switches connected to the load unit 300 in the idle period T32. As another example, the switch circuit 200 may provide the converting current IL to a ground terminal in the idle period T32. The switch circuit 200 may provide the converting current IL to a second load IP2 in a third time period T33 after the idle period T32. The converting current IL may be a single-phase current or a multi-phase current.

Figure 11:
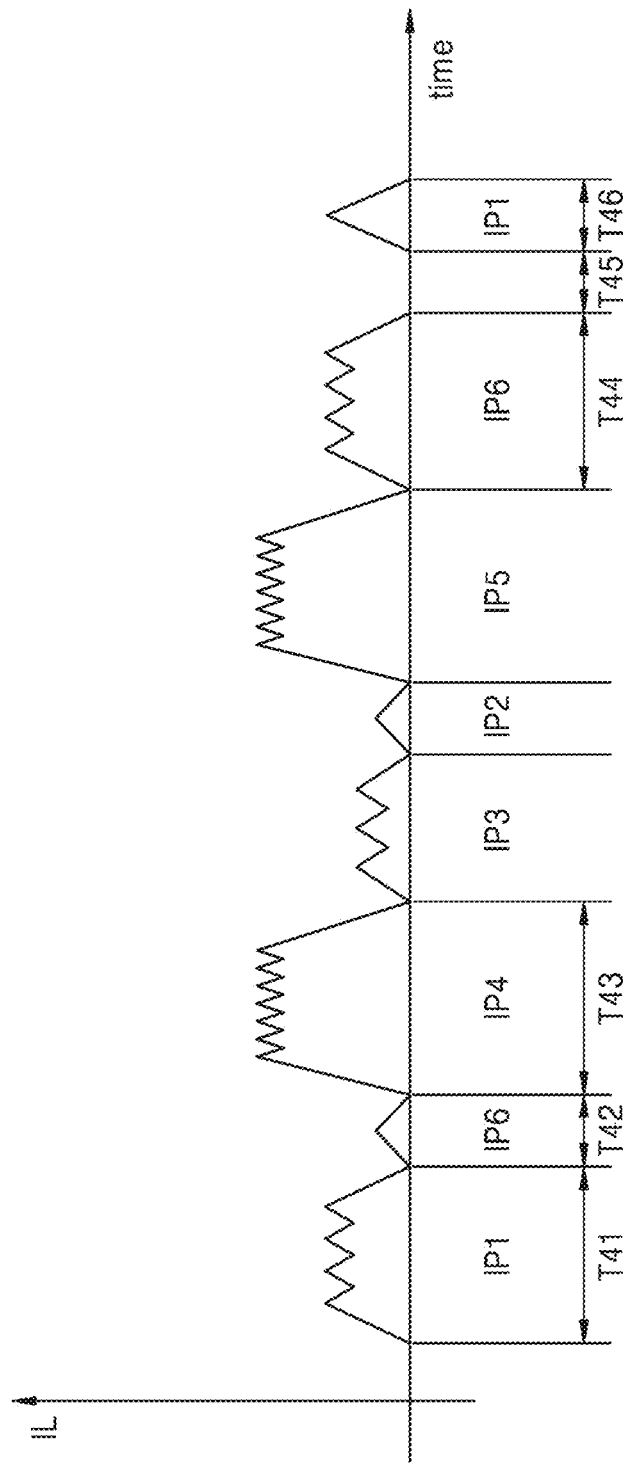
FIG. 11 is a diagram for describing a waveform of a converting current according to an example embodiment.

FIG. 11 is a diagram for describing a waveform of a converting current according to an example embodiment. In FIGS. 1 and 11, like reference numerals refer to like elements.

Referring to FIG. 11, a converting current IL may be a current output from the converter 100 having the continuous conduction mode. In the continuous conduction mode, the converting current IL may have one or more ripples in a certain time period. For example, the converting current IL may have four ripples in a first time period 41, have one ripple in a second time period 42, and have seven ripples in a third time period 43. In the first time period 41 and the second time period 42, the converting current IL may have different periods and may be provided to different loads. For example, the converting current IL may be provided to a first load IP1 in the first time period 41, and after a level of the converting current IL is 0, the converting current IL may be provided to a sixth load IP6 in the second time period 42.

According to an example embodiment, the converting current IL may have different levels, periods, and ripples in time periods T41 to T43, and when a certain time period elapses, a level of the converting current IL may be 0. In this context, the converting current IL may be considered to be in the discontinuous conduction mode. The converting current IL may have one or more ripples in one time period (for example, T41). In this context, the converting current IL may be considered to be in the continuous conduction mode. That is, the converter 100 may output the converting current IL having the continuous conduction mode, and as in the discontinuous conduction mode, when a level of the converting current IL is 0, the switch circuit 200 may perform a switching operation. Therefore, the switch circuit 200 may decrease switching loss.

According to an example embodiment, the converting current IL may have an idle period T45. For example, the converting current IL may be provided to a sixth load in a fourth time period T44, and then, when a level of the converting current IL is 0, the converting current IL may have the idle period T45. After the idle period T45 elapses, the converting current IL may be provided to a first load IP1 in a fifth time period T46. In addition, the idle period T45 has been described above with reference to FIG. 7, and thus, its detailed description is omitted.

The converting current IL described above with reference to FIGS. 7 to 11 may be a converting current described above along with the electronic system 10 described above with reference to FIGS. 1 to 6 or the internal elements of the electronic system 10. Also, when the converter 100 is implemented as a buck converter type, the converting current IL may have a triangular waveform as in FIGS. 7 to 11, but when the converter 100 is implemented as a chuck converter type, the converting current IL may have a ∩-shaped waveform (or a triangular waveform).

Figure 12:
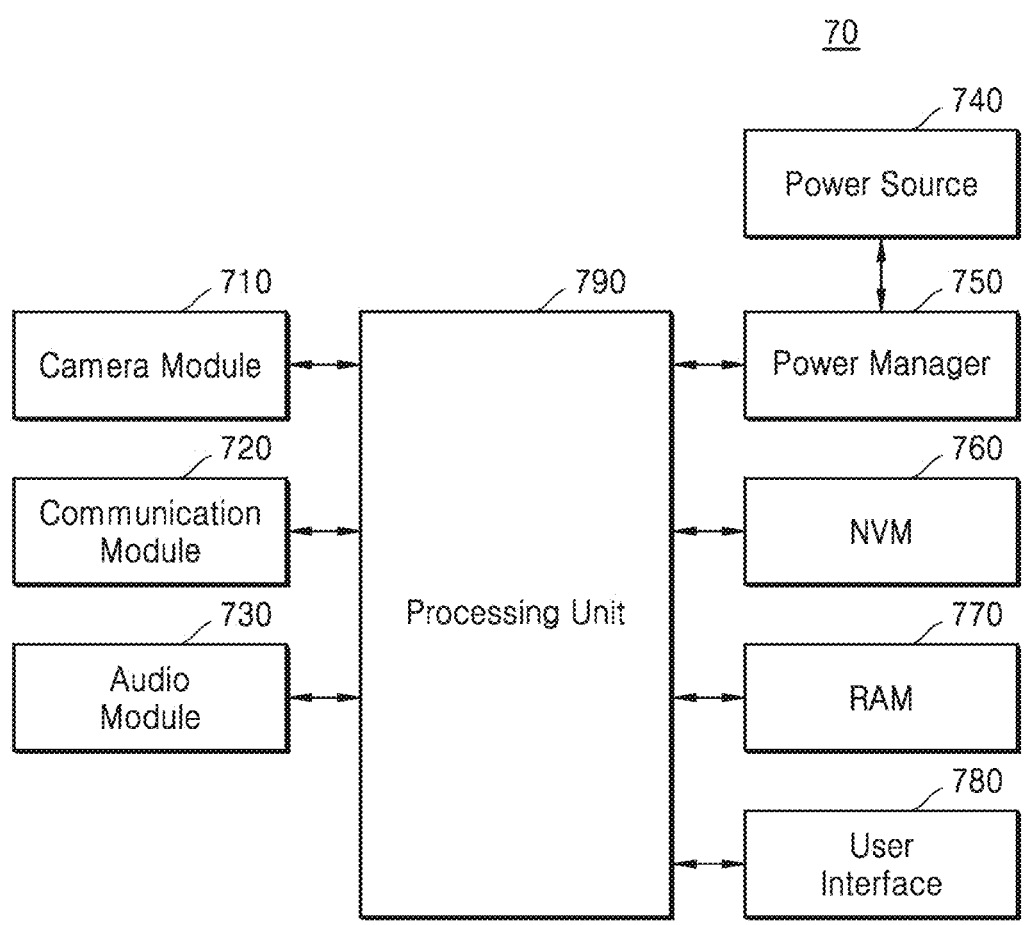
FIG. 12 is a block diagram for describing a mobile electronic device according to an example embodiment.

FIG. 12 is a block diagram for describing a mobile electronic device 70 according to an embodiment.

The mobile electronic device 70 may include a camera unit 710, a wireless communication module 720, an audio module 730, a power source 740, a power manager 750, a non-volatile memory 760, random access memory (RAM) 770, a user interface 780, and a processing unit 790. Examples of the mobile electronic device 70 may include portable terminals, portable personal assistants (PDAs), personal media players (PMPs), digital cameras, smartphones, smartwatches, tablet personal computers, and wearable devices.

The camera unit 710 may include a lens, an image sensor, and an imaging processor. The camera unit 710 may be provided with light through the lens, and the image sensor and the imaging processor may generate an image on the basis of the provided light.

The wireless communication module 720 may include an antenna, a transceiver, and a modem. The wireless communication module 720 may communicate with the outside of the mobile electronic device 70 according to various wireless communication protocols such as 5G, long term evolution (LTE), world interoperability for microwave access (WiMax), global system for mobile communication (GSM), code division multiple access (CDMA), Bluetooth, near field communication (NFC), wireless fidelity (WiFi), and radio frequency identification (RFID).

The audio module 730 may process an audio signal by using an audio signal processor. The audio module 730 may be provided with an audio input through a microphone and may provide an audio output through a speaker.

The power source 740 may provide power needed for the mobile electronic device 70. For example, the power source 740 may be a battery included in the mobile electronic device 70, and the battery may be, for example, a lithium-ion battery. As another example, the power source 740 may be a power adaptor (or a travel adaptor) outside the mobile electronic device 70.

The power manager 750 may manage power used for an operation of the mobile electronic device 70. For example, the power manager 750 may stabilize a voltage applied from the power source 740 and may output a stabilized voltage. The power manager 750 may include at least one of the converter 100, the switch circuit 200, the load unit 300, the controller 400, the inductors, and the capacitors according to an embodiment. That is, the power manager 750 may be implemented with at least some elements of the electronic system 10. Also, the power manager 750 may be implemented as a PMIC or IVR type. The power manager 750 may supply power to the elements (or intellectual properties (IPs)) of the mobile electronic device 70. For example, at least one of the camera unit 710, the wireless communication module 720, the audio module 730, the non-volatile memory 760, the RAM 770, the user interface 780, and the processing unit 790 each included in the mobile electronic device 70 may operate with a voltage supplied from the power manager 750.

The non-volatile memory 760 may store maintenance-required data regardless of the supply of power. For example, the non-volatile memory 760 may include at least one of NAND-type flash memory, phase-change RAM (PRAM), magneto resistive RAM (MRAM), resistive RAM (ReRAM), Ferro-electric RAM (FRAM), and NOR-type flash memory.

The RAM 770 may store data used for an operation of the mobile electronic device 70. For example, the RAM 770 may be used as a working memory, an operation memory, and a buffer memory of the mobile electronic device 70. The RAM 770 may temporarily store data which has been processed or is to be processed by the processing unit 790.

The user interface 780 may process interfacing between a user and the mobile electronic device 70 on the basis of control by the processing unit 790. For example, the user interface 780 may include an input interface such as a keyboard, a keypad, a button, a touch panel, a touch screen, a touch pad, a touch ball, a camera, a microphone, a gyroscope sensor, or a vibration sensor. Also, the user interface 780 may include an output interface such as a display apparatus or a monitor. For example, the display apparatus may include one or more of a liquid crystal display (LCD), a light-emitting diode (LED) display, an organic LED (OLED) display, and an active matrix OLED (AMO-LED) display.

The processing unit 790 may control overall operations of the mobile electronic device 70. The camera unit 710, the wireless communication module 720, the audio module 730, the non-volatile memory 760, and the RAM 770 may execute a user command provided through the user interface 780 on the basis of control by the processing unit 790. Alternatively, the camera unit 710, the wireless communication module 720, the audio module 730, the non-volatile memory 760, and the RAM 770 may provide a service to the user through the user interface 780 on the basis of control by the processing unit 790. The processing unit 790 may include a plurality of core units, an internal memory, a memory interface, and other elements, and the core units may each include at least one core. For example, the processing unit 790 be the load unit 300 according to an example embodiment and may be implemented with a CPU, an AP, or an MoDAP or may be implemented with a processing logic included in the CPU, the AP, or the MoDAP. The processing unit 790 may be implemented as a system on chip (SoC).

The elements of the electronic systems described herein such as the converter 100 and/or controller 400, described above, including control pulse generator 410, subtraction unit 420 and scale unit 430, may be implemented in processing circuitry such as hardware including logic circuits; a hardware/software combination such as a processor executing software; or a combination thereof and memory. For example, the processing circuitry more specifically may include, but is not limited to, a central processing unit (CPU), an arithmetic logic unit (ALU), a digital signal processor, a microcomputer, a field programmable gate array (FPGA), a programmable logic unit, a microprocessor, application-specific integrated circuit (ASIC), etc.

The processing circuitry may be special purpose processing circuitry that improves the functioning of the electronic system by allowing two or more voltage regulators and two or more inductors to be utilized. Therefore, the processing circuitry may improve the functioning of the electronic device itself by dynamically supplying power on the basis of various states of power supplied to the load unit 300 thus satisfying the power requirements of various loads (e.g., a processor) while reducing (or, alternatively, minimizes) a total amount of current for a power source including a plurality of voltage regulators.

As described above, the example embodiments have been disclosed in the drawings and the specification. While the inventive concept has been particularly shown and described with reference to exemplary embodiments thereof, it will be understood by those of ordinary skill in the art that various changes in form and details may be made therein without departing from the spirit and scope of the inventive concept as defined by the following claims. Therefore, it may be understood that various modifications and other equivalent embodiments may be implemented by those of ordinary skill in the art. Therefore, the spirit and scope of the inventive concept should be defined by claims.

While example embodiments of the inventive concepts have been particularly shown and described with reference to some example embodiments thereof, it will be understood that various changes in form and details may be made therein without departing from the spirit and scope of the following claims.

What is claimed is:
1. An electronic system comprising:
a plurality of voltage regulators configured to convert an input voltage;
a plurality of inductors connected to respective ones of the plurality of voltage regulators, the plurality of inductors configured to output a plurality of converting currents, respectively; and
a switching device configured to select at least one selected converting current from among the plurality of converting currents in response to a switching control signal, and to supply power to a load based on the at least one selected converting current, wherein the plurality of inductors include a first inductor and a second inductor, the first inductor configured to output a first converting current and the second inductor configured to output a second converting current, and the switching device is configured to select the first converting current in a first time period, and to select the second converting current in a second time period.

2. The electronic system of claim 1, wherein a first end of the switching device is connected to the plurality of inductors, and a second end of the switching device is connected to a node, the node connected to a capacitor and the load.

3. The electronic system of claim 2, wherein
the capacitor is configured to generate an output voltage based on the at least one selected converting current from the switching device, and to supply the output voltage to the load.

4. The electronic system of claim 3, wherein the plurality of voltage regulators are controllable via a regulator control signal, and the electronic system further comprises:
a controller configured to,
receive the output voltage as feedback, and
generate the switching control signal and the regulator control signal based on the output voltage provided as feedback thereto.

5. The electronic system of claim 1, wherein the switching device is configured to switch from the first converting current to the second converting current in response to a level of the first converting current reaching 0.

6. The electronic system of claim 1, wherein the switching device is configured to summate two or more converting currents from among the plurality of converting currents to output a summated current in response to the switching control signal.

7. The electronic system of claim 1, wherein
the load includes a first load and a second load, and
at least one of the plurality of converting currents is temporally divided such that the at least one selected converting current is provided to the first load in a first time period and provided to the second load in a second time period.

8. The electronic system of claim 1, wherein
the load includes a first load, a second load, and a third load, and
the first load is selectively connected to one of the plurality of inductors, the second load is selectively connected to two of the plurality of inductors, and the third load is selectively connected to three of the plurality of inductors.

9. The electronic system of claim 1, wherein the switching device comprises:
a plurality of freewheeling switches connected in parallel to the plurality of inductors, respectively.

10. An electronic system comprising:
a plurality of voltage regulators configured to convert an input voltage;
a plurality of inductors respectively connected to respective ones of the plurality of voltage regulators, the plurality of inductors configured to output a plurality of converting currents, respectively;
a switching device configured to select at least one selected converting current from among the plurality of converting currents in response to a switching control signal;

a capacitor connected to an output of the switching device, the capacitor configured to generate an output voltage based on the at least one selected converting current; and
a load configured to operate based on the output voltage.

11. The electronic system of claim 10, wherein the load includes a core unit, an internal memory, or a memory interface.

12. The electronic system of claim 10, wherein inputs of the switching device are connected to the plurality of inductors, and the output of the switching device is connected to a node, the node connected to the capacitor and the load.

13. The electronic system of claim 10, wherein
the plurality of inductors include a first inductor and a second inductor, the first inductor configured to output a first converting current and the second inductor configured to output a second converting current, and
the switching device is configured to select the first converting current in a first time period, and to select the second converting current in a second time period.

14. The electronic system of claim 13, wherein the switching device is configured to switch from the first converting current to the second converting current in response to a level of the first converting current reaching 0.

15. The electronic system of claim 10, wherein the switching device is configured to summate two or more converting currents from among the plurality of converting currents to output a summated current in response to the switching control signal.

16. The electronic system of claim 10, wherein
the load includes a first load and a second load, and
at least one of the plurality of converting currents is temporally divided such that the at least one selected converting current is provided to the first load in a first time period and provided to the second load in a second time period.

17. The electronic system of claim 10, wherein
the load includes a first load, a second load, and a third load, and
the first load is selectively connected to one of the plurality of inductors, the second load is selectively connected to two of the plurality of inductors, and the third load is selectively connected to three of the plurality of inductors.

18. The electronic system of claim 10, further comprising:
a plurality of freewheeling switches connected in parallel to the plurality of inductors, respectively.

19. An electronic system comprising:
a plurality of voltage regulators configured to convert an input voltage based on a regulator control signal;
a plurality of inductors connected to respective ones of the plurality of voltage regulators, the plurality of inductors configured to output a plurality of converting currents, respectively;
a switching device configured to select at least one selected converting current from among the plurality of converting currents in response to a switching control signal; and
a controller configured to,
receive an output voltage based on the at least one selected converting current as feedback,
compare the output voltage with a reference voltage, and output the switching control signal and the regulator control signal.

\* \* \* \* \*